(12) United States Patent
Scheufler et al.

(10) Patent No.: US 11,565,636 B2
(45) Date of Patent: Jan. 31, 2023

(54) ADAPTABLE STOWAGE ELEMENTS

(71) Applicant: Ford Global Technologies, LLC, Dearborn, MI (US)

(72) Inventors: Nicholas Alexander Scheufler, Flat Rock, MI (US); David Joseph Orris, Southgate, MI (US); Stephen Jay Orris, Jr., New Boston, MI (US); Nunzio Decia, Northville, MI (US); David A. Herman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 16/643,708

(22) PCT Filed: Sep. 13, 2017

(86) PCT No.: PCT/US2017/051295
§ 371 (c)(1),
(2) Date: Mar. 2, 2020

(87) PCT Pub. No.: WO2019/054996
PCT Pub. Date: Mar. 21, 2019

(65) Prior Publication Data
US 2020/0207289 A1 Jul. 2, 2020

(51) Int. Cl.
*B60R 5/00* (2006.01)
*B60R 16/023* (2006.01)
*G06N 20/00* (2019.01)
*B60P 1/00* (2006.01)
*G06Q 50/28* (2012.01)
*B60R 16/02* (2006.01)

(52) U.S. Cl.
CPC .............. *B60R 16/023* (2013.01); *B60P 1/00* (2013.01); *B60R 5/00* (2013.01); *G06N 20/00* (2019.01); *G06Q 50/28* (2013.01)

(58) Field of Classification Search
CPC ......... B60R 5/00; B60R 16/02; B60R 16/023; B60P 1/00; G06N 20/00
See application file for complete search history.

(56) References Cited

U.S. PATENT DOCUMENTS

| | | | |
|---|---|---|---|
| 4,718,584 A | 1/1988 | Schoeny | |
| 6,502,731 B1 | 1/2003 | Gehring et al. | |
| 6,810,309 B2 | 10/2004 | Sadler et al. | |
| 7,421,112 B2 * | 9/2008 | Calver | G01S 17/89 348/148 |
| 7,467,035 B2 | 12/2008 | Sayce-Jones | |

(Continued)

OTHER PUBLICATIONS

Beetlesmart in Living, "Handy Pop-up Trunk Shelf" retrieved from Internet URL https://www.instructables.com/id/Handy-Pop-up-Trunk-Shelf (9 pages).

(Continued)

*Primary Examiner* — Tan Q Nguyen
(74) *Attorney, Agent, or Firm* — Brandon Hicks; Bejin Bieneman PLC

(57) ABSTRACT

A current location and a destination location of a vehicle are identified. A stowage parameter is predicted based on the current and destination locations. A vehicle component is actuated based on the stowage parameter.

19 Claims, 4 Drawing Sheets

(56) References Cited

U.S. PATENT DOCUMENTS

| | | | |
|---|---|---|---|
| 7,499,802 B2 * | 3/2009 | Mishima | G06Q 10/08 |
| | | | 701/2 |
| 7,607,672 B2 | 10/2009 | Suzuki et al. | |
| 7,746,379 B2 * | 6/2010 | Jesson | G06Q 10/087 |
| | | | 348/161 |
| 7,758,092 B2 | 7/2010 | Kolpasky et al. | |
| 8,814,245 B1 | 8/2014 | Welch et al. | |
| 9,429,443 B2 | 8/2016 | Hoch | |
| 9,639,909 B2 | 5/2017 | Baldwin | |
| 10,387,822 B1 * | 8/2019 | Bolton | G06Q 10/0835 |
| 2009/0201163 A1 | 8/2009 | Decoster et al. | |
| 2011/0068954 A1 * | 3/2011 | McQuade | G08G 1/20 |
| | | | 340/988 |
| 2012/0053785 A1 * | 3/2012 | Wittorf | B60R 5/04 |
| | | | 701/36 |
| 2012/0259509 A1 * | 10/2012 | Wittorf | G06Q 10/08 |
| | | | 701/34.4 |
| 2015/0134182 A1 | 5/2015 | Ollis | |
| 2017/0139413 A1 * | 5/2017 | James | G06Q 10/00 |

OTHER PUBLICATIONS

International Search Report of the International Searching Authority for PCT/US2017/051295 with dated Nov. 21, 2017.

* cited by examiner

ADAPTABLE STOWAGE ELEMENTS

BACKGROUND

Vehicles can transport users and cargo to destinations. Upon arriving at the vehicle, a user may possess an object, such as luggage, that needs to be stored in the vehicle during transport. However, a vehicle may not have room for an object and/or a practical place to stow the object. Problems with current object stowage and transport technology include a lack of ability to predict object stowage needs and/or to accommodate stowage of various objects to be transported in a vehicle.

DETAILED DESCRIPTION

Figure 1:
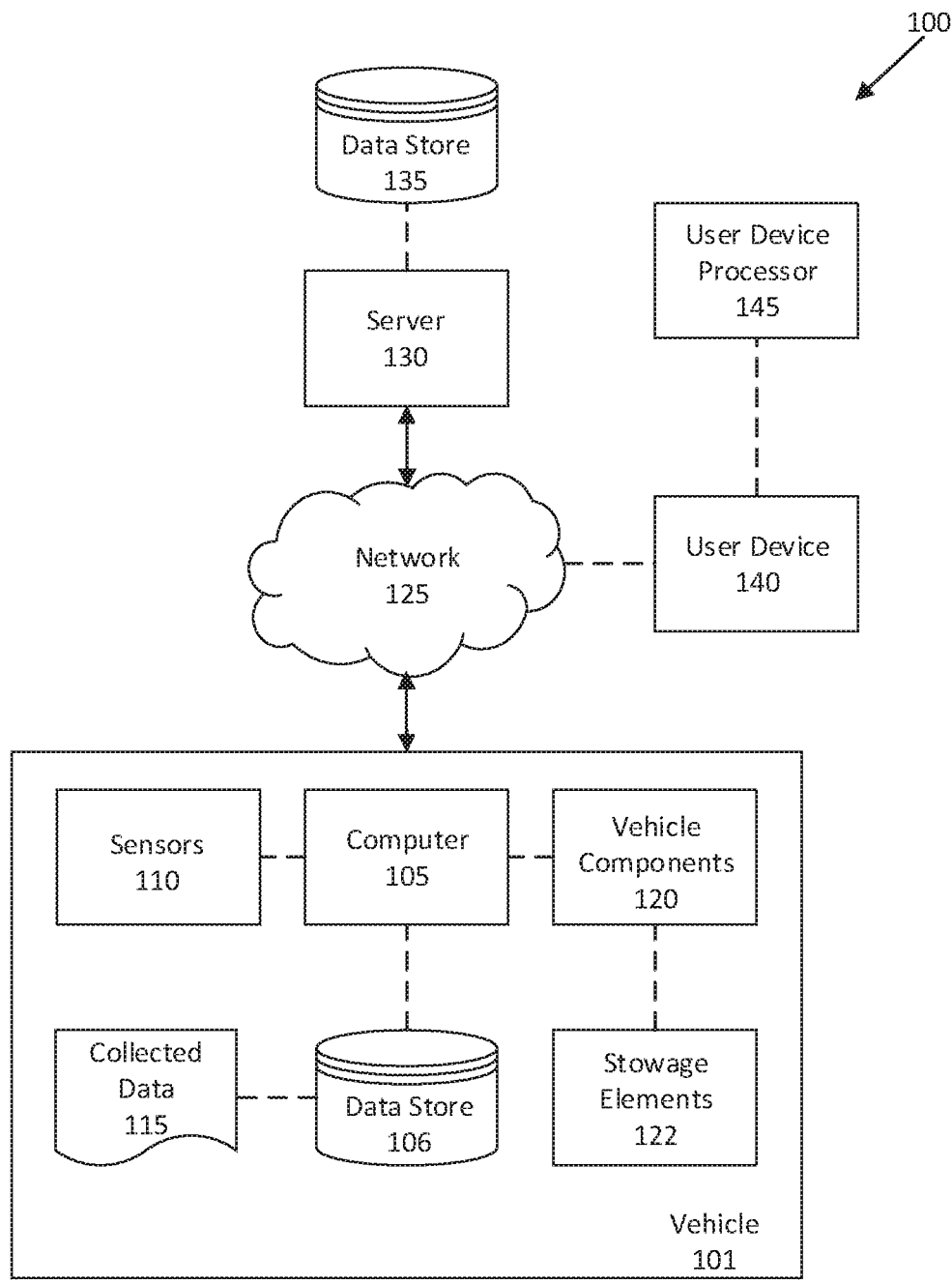
FIG. 1 is a block diagram of an example system for predicting stowage parameters in a vehicle.

A system includes a computer programmed to identify a current location and a destination of a vehicle, predict a stowage parameter based on the current and destination locations, and actuate a vehicle component based on the stowage parameter.

The vehicle component can be one of a suspension, a shelf, a hook, a storage bin, and a seat.

The computer can be further programmed to predict the stowage parameter based on a characteristic of an object as well as one or both of the current and destination locations in the vehicle. The computer can be further programmed to predict one stowage parameter for each object of a plurality of objects.

The computer can be further programmed to receive a message from a user device and predict the stowage parameter based on the message from the user device. The computer can be further programmed to predict the stowage parameter based on a vehicle activity log. The computer can be further programmed to predict the stowage parameter based on a message from each sensor in a set of seat sensors. The computer can be further programmed to predict the stowage parameter by applying rules derived from machine learning.

A system includes a vehicle stowage element having an actuator arranged to move at least part of the stowage element, and a computer programmed to identify a current location and a destination of a vehicle, predict a stowage parameter based on the current and destination locations, and actuate a vehicle component based on the stowage parameter.

The computer can be further programmed to predict the stowage parameter based on a characteristic of an object as well as one or both of the current and destination locations in the vehicle.

A method includes identifying a current location and a destination location of a vehicle, predicting a stowage parameter based on the current and destination locations, and actuating a vehicle component based on the stowage parameter.

The vehicle component can be one of a suspension, a shelf, a hook, a storage bin, and a seat.

The method can further include predicting the stowage parameter based on a characteristic of an object as well as one or both of the current and destination locations in the vehicle. The method can further include predicting one stowage parameter for each object of a plurality of objects.

The method can further include receiving a message from a user device and predict the stowage parameter based on the message from the user device. The method can further include predicting the stowage parameter based on a vehicle activity log. The method can further include predicting the stowage parameter based on a message from each sensor in a set of seat sensors. The method can further include predicting the stowage parameter by applying rules derived from machine learning.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100, including a computer 105 programmed to identify a current location and a destination location of a vehicle 101, and predict a stowage parameter based on the current and destination locations of the vehicle 101. A stowage parameter in the context of this disclosure is a value or rule specifying a manner in which objects at a location can be stored or stowed, e.g., for transport between a current location and a destination location, in a vehicle 101. The computer 105 can maintain lists of stowage parameters in the vehicle 101 based on vehicle 101 locations and objects stowed in the vehicle 101. The computer 105 can maintain a list of possible stowage parameters according to substantially unique identifiers for each parameter and/or descriptors (e.g., "hang," "enclose," "support," etc.), along with a set of coordinates specifying a vehicle 101 location associated with each respective parameter. The computer 105 can store a set geo-coordinates indicating a vehicle 101 location and/or can store an identifier for the object that can likewise be associated with a stowage parameter. Based on the vehicle 101 location and the object, the computer 105 can determine the stowage parameter required at a specific location. The computer 105 can then actuate one or more vehicle 101 components based on the stowage parameter, e.g., to navigate the vehicle 101 to the destination location.

A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). The navigation system can continuously monitor the location data 115 for the current location of the vehicle 101. The user can input the location data 115 for a destination location into the navigation system, e.g., to receive directions to the destination location. Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively, or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, stowage elements, etc.

The vehicle 101 can include a suspension component. The suspension component controls the height of a vehicle 101 body relative to a driving surface. For example, the suspension component can include springs, shocks, etc. to maintain a consistent height of the vehicle 101 body while the vehicle 101 is in transit. The suspension component can be adjusted to change the height of the vehicle 101 body. For example, the suspension component can be actuated between a driving position and a stowage position. When the suspension component is in the driving position, the vehicle 101 body is farther from the driving surface than compared to when the suspension component is in the stowage position. The suspension component can be in the driving position, e.g., when the vehicle 101 is in transit. The suspension component can be in the stowage position, e.g., at a current location and/or a destination location, to assist with the stowage of an object. The computer 105 can actuate the suspension component from the driving position to the stowage position based on the stowage parameters.

The vehicle 101 can include a human-machine interface (HMI) 120, e.g., one or more of a display, a touchscreen display, a microphone, a speaker, etc. The user can input data 115 into the HMI 120, e.g., the current location of the vehicle 101, the destination location of the vehicle 101, an object to be stowed at one of the current and destination locations, etc. For example, the user can input the object data 115, e.g., object characteristics, an identifier associated with the object, and image of the object, etc., into the HMI 120 and the computer 105 can determine the stowage parameter for stowing the object. As another example, the user can input location data 115, e.g., a destination location, into the HMI 120, and the computer 105 can determine the stowage parameters for stowing objects associated with e.g., acquirable at, the destination location. The HMI 120 can communicate with the computer 105 via the vehicle 101 network, e.g., the HMI 120 can send a message including the user input, e.g., the location data 115 and/or the object data 115, to the computer 105. The computer 105 can determine the stowage parameters based on the message from the HMI 120.

The vehicle 101 includes a plurality of seats 120. The seats 120 can support users in the vehicle 101 cabin. The seats 120 can be arranged in the vehicle 101 cabin to accommodate users and objects, e.g., luggage. The seats 120 can be folded from a seated position to a stowage position. In the seated position in one example, a seatback can extend upwardly relative to a seat bottom, e.g., the seat can support a user in a conventional sitting position. Continuing this example, in the stowage position, the seatback can extend substantially parallel to the seat bottom, e.g., the seatback can lay across the seat bottom, and can support objects stowed in the vehicle 101.

Each seat 120 can include a seat sensor 110. The seat sensor 110 can detect the presence of a user sitting on the seat 120. The seat sensor 110 can send data 115 to the computer 105, and the computer 105 can determine whether a user is present in the seat 120. The computer 105 can compare the data 115 from the seat sensor 110 to a threshold. When the data 115 from the user detection sensor 110 exceeds the threshold, the computer 105 can determine that a user is in the seat 120. For example, if the seat sensor 110 is a weight sensor, the computer 105 can compare collected user weight data 115 to a weight threshold. When the user weight data 115 exceed the weight threshold, the computer 105 can determine that the user is present in the seat 120. When the data 115 from the seat sensor 110 is below the threshold (e.g., the user weight data 115 are below the weight threshold), the computer 105 can determine that the user is not in the seat 120.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 providing communications between other devices, e.g., a server 130 and a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 may include a user device 140. As used herein, a "user device" is a portable, computing device that includes a memory, a processor, a display, and one or more input mechanisms, such as a touchscreen, buttons, etc., as well as hardware and software for wireless communications such as described herein. Accordingly, the user device 140 may be any one of a variety of computing devices including a processor and a memory, e.g., a smartphone, a tablet, a personal digital assistant, etc. The user device 140 may use the network 125 to communicate with the vehicle computer 105. For example, the user device 140 can be communicatively coupled to each other and/or to the vehicle computer 105 with wireless technologies such as described above. The user device 140 includes a user device processor 145.

The computer 105 can predict the stowage parameters based on the object data 115 and/or the location data 115. The computer 105 can receive the object data 115 and/or the location data 115 from the HMI 120, a cloud computer, e.g., a computer connected to the network 125 and external to the vehicle 101, sensors 110, e.g., a camera capturing an image of the object, the user device 140, etc. The computer 105 can determine the stowage parameter by analyzing the object data 115 and/or location data 115, e.g., the computer 105 can determine whether the objects will fit in the vehicle 101 based on the object data 115, e.g., object characteristics, and can predict whether an object will be stowed based on location data 115. The computer 105 can actuate a vehicle component 120 according to the stowage parameter.

The computer 105 can include a machine learning program to predict the stowage parameters of the vehicle 101. The machine learning program may substantially continuously monitor the vehicle 101 location and the objects stowed at the locations of the vehicle 101. In other words, the machine learning program may store object data 115, location data 115, and storage parameters. For example, the machine learning program may include a vehicle activity log that records, at various times, the vehicle 101 location and objects stored in the vehicle 101. The vehicle activity log may store location data 115 and object data 115, e.g., the vehicle activity log may store historical data 115, e.g., data 115 from previous travels, of the vehicle 101. The vehicle activity log can be populated by the object data 115 and the location data 115 from the HMI 120, e.g., the user could input the object and location data 115, from the network 125, e.g., the vehicle activity log may be in communication with the network 125 to receive object data 115, the sensors 110, e.g., a camera could capture an image of the object, from GPS, etc. The machine learning program can predict the stowage parameters based on the location data 115, e.g., the machine learning program can predict the same stowage parameters identified when the location data 115 indicates the vehicle 101 is returning to a previous location. Additionally, the machine learning program can predict the stowage parameters based on the object data 115, e.g., the machine learning program can predict the stowage parameters based on the object, e.g., the type of object, the size of the object, etc., being stowed in the vehicle 101.

The computer 105 can predict the stowage parameters based on the applying rules derived from the machine learning program. For example, when a vehicle 101 is at a location, if stored object data 115 of the object(s) stored at the location corresponds to the stored object data 115, the machine learning program can increase a probability that an object corresponding to the object data 115 will be stowed at the location. Otherwise, the machine learning program can decrease the probability. The computer 105 can predict the stowage parameters based on the probability determined by the machine learning program, e.g., the computer 105 can predict stored stowage parameters when the probability is above a threshold.

Figure 2:
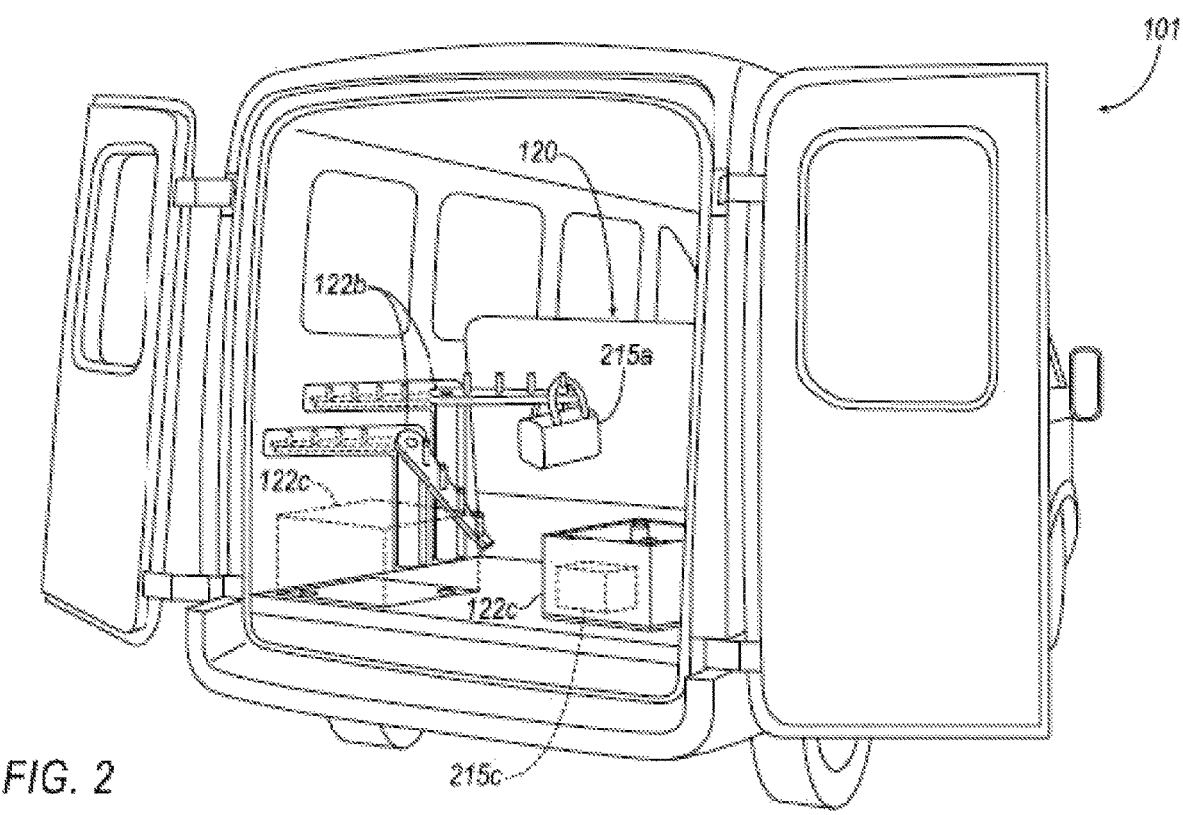
FIG. 2 is a perspective view of example stowage elements in an example vehicle.
Figure 3:
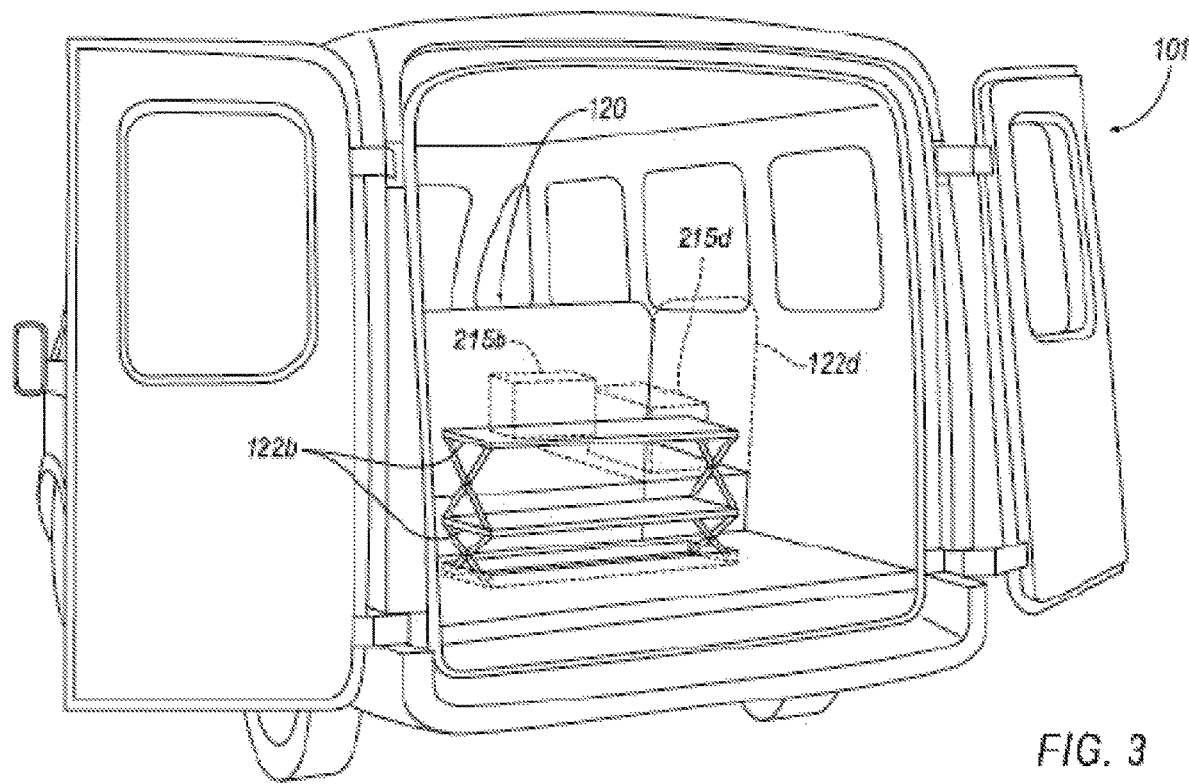
FIG. 3 is perspective view of other example stowage elements in an example vehicle.

FIGS. 2 and 3 illustrate and example vehicle 101. The vehicle 101 includes a plurality of stowage elements 122a, 122b, 122c, and 122d, referred to collectively as stowage elements 122. A stowage element is any component in the vehicle 101 capable of supporting and/or stowing an object when the vehicle 101 is in transit. For example, a stowage element 122a can be can be a swing arm, e.g., to hang objects, a stowage element 122b a shelf, e.g., to support objects, a stowage element 122c can be a storage bin, e.g., to enclose objects, and a stowage element 122d can be a seatback when the seat 120 is in the stowage position, e.g., the seatback of the seat 120 can support objects. The example of FIG. 2 shows two objects, 215a, 215b (collectively, objects 215) supported by stowage elements 122a, 122c, respectively. The example of FIG. 3 shows two objects 215a, 215b supported by stowage elements 122b, 122d, respectively. The stowage elements 122 can be actuated individually and/or collectively to support a plurality, e.g., one or more, objects in the vehicle 101. In other words, the computer 105 can actuate one or more stowage elements 122 based on the object data 115. The computer 105 can determine the stowage element 122 for each object and can actuate the stowage elements 122 to support each object, as described below.

The objects 215 may be any object transportable in the vehicle 101 by the user. For example, the user may transfer the objects 215 into the vehicle 101 at the current location and transport the objects 215 to the destination location in the vehicle 101. The objects 215 may be, for example, luggage, a parcel, a crate, or any other object that the user may carry on to the vehicle 101. The computer 105 can determine characteristics of the objects 215. An object characteristic is any physical property of the object 215. For example, object characteristics can include dimensions of the object, e.g., length, height, width, circumference, etc., as applicable. As another example, a characteristic may be a mass or weight of the object. As yet another example, a characteristic can be a physical feature of the object, e.g., hangable, fragile, durable, etc. The computer 105 can determine the object 215 is fragile based on a material type of the object 215, e.g., glass, porcelain, plastic, metal, etc. When the material type of the object 215 is at risk of breaking, e.g., glass, porcelain, etc., the computer 105 can determine that the object 215 is fragile, and can predict a "fragile" stowage parameter to protect the object 215. For example, the computer 105 could store a look-up table or the like specifying a list of object materials, e.g., plastic, glass, cloth, etc., along with stowage parameters associated with each, e.g., plastic could be associated with a "tough" parameter, and glass could be associated with a "fragile" parameter. The vehicle 101 can include a plurality of sensors 110, e.g., a vehicle image sensor, etc., that can detect characteristics of the object 215, e.g., as described in Table 1 below. Additionally, or alternatively, the user can identify the characteristics of the object 215 via the user device 140.

Table 1 illustrates an example source of object data 115 that the computer 105 can analyze to determine the characteristics of the object 215.

TABLE 1

| Object characteristics | Source of object data |
|---|---|
| Dimensions | Receiving an image of the object via the sensors |
| | User input to the HMI |
| | Receiving a message via the network |
| Weight | Receiving an image of the object via the sensors |
| | User input to the HMI |
| | Sensors detecting weight of object stowed in the vehicle |
| | Receiving a message via the network |
| Physical Features (e.g., materials, surface features such as loops for hooks, handles, etc.) | Receiving an image of the object via the sensors |
| | User input to the HMI |
| | Receiving a message via the network |

Table 2 illustrates an example set of data, e.g., a look-up table or the like, that a computer 105 can store to determine stowage elements 122 in a vehicle 101 for an object based on characteristics of the object.

TABLE 2

| Object Characteristics | Stowage Element |
|---|---|
| Object has handles | Swing arm 122a, Shelf 122b, Seatback 122d |
| Object is formed of fragile material, e.g., glass, porcelain, etc. | Storage bin 122c |
| Object has a volume, e.g., length, width, height, above a threshold | Shelf 122b, Seatback 122d |
| Object has a weight above a threshold | Seatback 122d |

The computer 105 can predict stowage parameters based on object data 115 and location data 115. The object data 115 can be a characteristic of an object 215. The computer 105 can compare the object 215 characteristics to the list of possible stowage parameters. For example, when an object 215 has one or more handles or loops, the computer 105 can determine that the object 215 is hangable, and can predict a stowage parameter to "hang." In this situation, the computer 105 can assign the object 215 to the swing arm 122a. As another example, when the material type of the object is at risk of breaking, e.g., glass, porcelain, etc., the computer 105 can determine that the object is fragile and can predict a stowage parameter to "enclose." In this situation, the computer 105 can assign the object to the storage bin 122c. As yet another example, when the weight and/or the dimensions of the object 215 are above a threshold, the computer 105 can determine that the object is large, e.g., the object 215 exceeds the carrying capacity of the swing arm 122a and/or the dimensions of the storage bin 122c, and can predict a stowage parameter to "support." In this situation, the computer 105 can assign the object 215 to the shelf 122b. Alternatively, the computer 105 can assign the object 215 to the seatback 122d when the seat 120 is in the stowage position, as set forth below. When the computer 105 assigns the object 215 to the seatback 122d, the object 215 may exceed the carrying capacity and/or the dimensions of the shelf 122b, i.e., the weight and/or dimensions of the object 215 may exceed a second threshold. The location data 115 can be geo-coordinate data, as set forth above, of the vehicle 101. The computer 105 can associate the location data 115 of the vehicle 101 with the object data 115, e.g., the computer 105 can identify objects stowed in the vehicle 101 at a specific location. The computer 105 can store the location data 115 and the object data 115 such that the computer 105 can predict specific object data 115 that can be received with specific location data 115, e.g., the computer 105 can predict whether an object will be stowed at a location.

The computer 105 can predict the stowage parameters based on a message sent from each sensor in a set of seat sensors 110. As set forth above, the seat sensor 110 can detect whether a user is in the seat 120. The computer 105 can actuate the seat 120 from the seated position to the stowage position. When the seat sensor 110 detects a user in the seat 120, the seat sensor 110 can send a message to the computer 105, and the computer 105 can retain the seat 120 in the seated position to support a user. Otherwise, the computer 105 can actuate the seat 120 from the seated position, shown in hidden (i.e., dashed) lines in FIG. 3, to the stowage position to support objects 215 stowed in the vehicle 101 cabin. For example, when the dimensions and/or the weight of an object 215 are above the second threshold, e.g., when the object 215 is larger than a shelf 122b and/or exceeds the carrying capacity of a shelf 122b, the computer 105 can actuate the seat 120 to the stowage position and assign the object to the seatback 122d.

The computer 105 can actuate the stowage elements 122 based on the stowage parameters, e.g., the stowage elements 122 can be associated with the stowage parameters. Further for example, the computer 105 can actuate the stowage elements 122 from a first position to a second position. For example, each stowage element 122 can include an actuator to move the stowage element 122 from the first position to the second position. The actuator can be any suitable mechanism, such as a motor, e.g., an electric motor, attached to a pivoting rod, a hydraulic cylinder attached to a pivoting rod. In another example, a spring can bias the stowage element 122 to the second position, e.g., a solenoid, a latch, etc., can retain the stowage element 122 in the first position and the computer 105 can send a message to release the solenoid, the latch, etc. such that the spring can move the stowage element 122 to the second position. The computer 105 can send a message to an actuator to move the stowage element 122 from the first position to the second position, e.g., to open a lid, lower a shelf or hook, etc.

In the first position, the stowage elements 122 can be positioned in the vehicle 101 such that the stowage elements 122 are disposed along the interior trim, e.g., a carpet, a pillar applique, the seatback, etc., of the vehicle 101, as shown in hidden lines in FIG. 2. In the second position, the stowage elements 122 can extend into the vehicle 101 cabin such that the stowage elements 122 can support one or more objects 215. The computer 105 can predict one stowage parameter for each object of a plurality of objects 215, e.g., the computer 105 can determine a characteristic of each object 215. In this situation, the computer 105 can actuate one or more stowage elements 122 from the first position to the second position to support each object 215 based on a characteristic of each object 215. In other words, the stowage elements 122 can be adaptable according to the objects 215 stowed in the vehicle 101.

Figure 4:
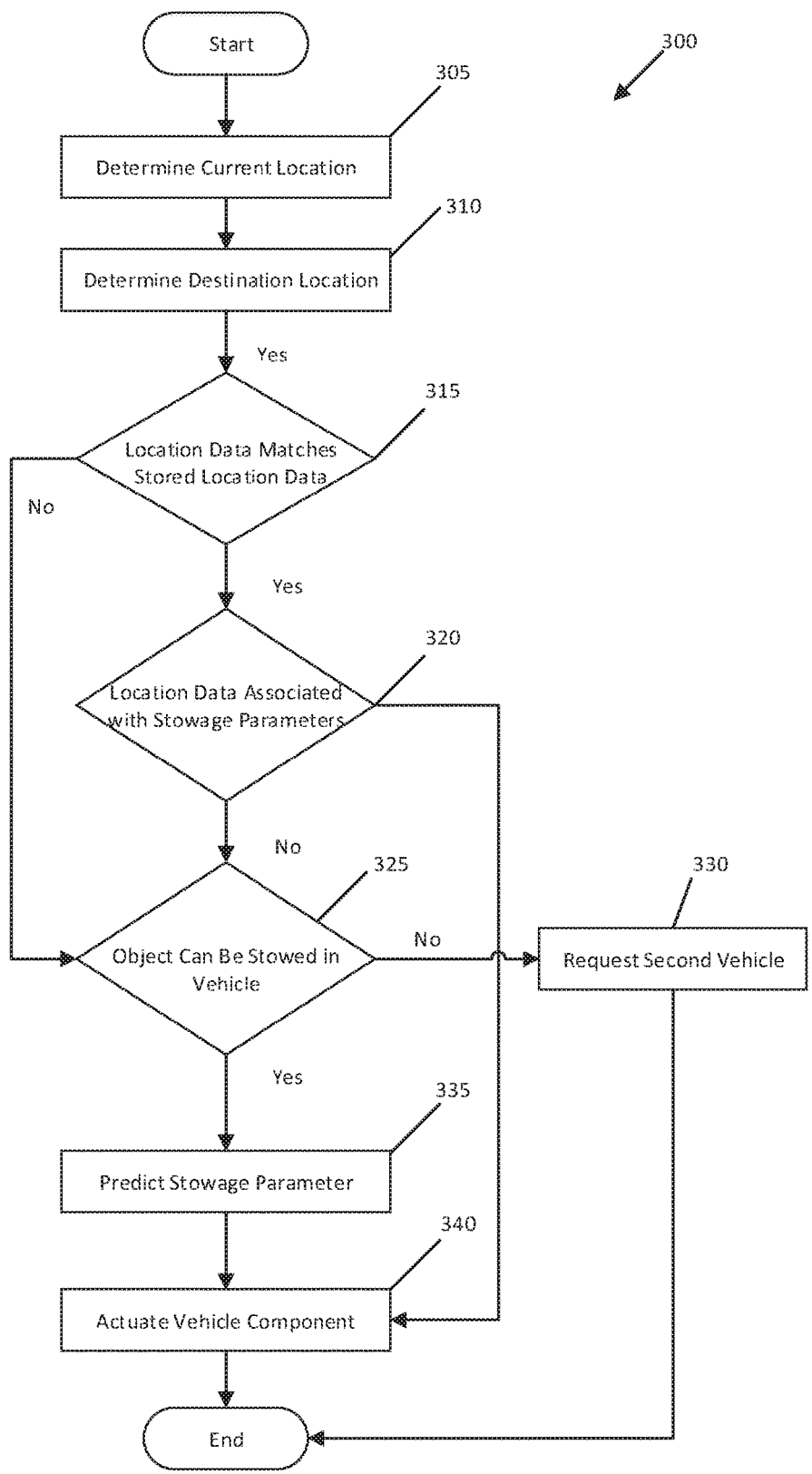
FIG. 4 is an example process for predicting stowage parameters of a vehicle.

FIG. 4 illustrates an example process 300 for predicting stowage parameters based on a current location and a destination location of the vehicle 101 and actuating a vehicle component 120 based on the stowage parameter. The process 300 begins in a block 305, in which the computer 105 determines a current location of the vehicle 101. As described above, the computer 105 can determine the current location of the vehicle 101 based on geo-coordinates provided via a navigation system, such as a GPS navigation system.

Next, in a block 310, the computer 105 determines a destination location of the vehicle 101. As described above, the computer 105 can determine the destination location of the vehicle 101 based on a message, e.g., location data 115, received via the HMI 120, the user device 140, the vehicle activity log input to a machine learning program, etc.

In the block 315, the computer 105 determines whether the destination location matches, i.e., specifies a location within a predetermined threshold distance of, e.g., 10 meters, 50 meters, 100 meters, etc., stored location data. In this context, the destination location can "match" the stored location data based on the geo-coordinates in the stored location data and one or more sets of geo-coordinates included in map data or other data stored in the computer 105 memory (or location data 115 can be a street address or some other set of data to specify a location). The computer 105 memory further typically stores respective location descriptors (e.g., "grocery store," "mall," "school," "home," "post office," etc.) associated with respective sets (latitude and longitude) of geo-coordinates. The location data 115 matches the stored location data when the location data 115 is within a threshold distance, e.g., within a radius, of the stored location data. As described above, the computer 105 can store object and/or location data 115 as a vehicle activity log. When the location data 115 matches the stored location data, e.g., the vehicle 101 returns to a previous location based on the geo-coordinates, an address, etc., a machine learning program can, using known techniques, predict object data 115 to be received, e.g., an object 215 to be stowed, at the location. If the computer 105 determines the location data 115 matches stored location data, the process 300 continues to a block 320. Otherwise, the process 300 continues to a block 325.

In the block 320, the computer 105 determines whether the location data 115 is associated with stowage parameters; the computer 105 can query its memory, data store, etc., to determine whether stowage parameters are stored for the location data 115. As described above, the computer 105 can store location data 115 and object data 115 associated, e.g., received, with the location data 115 to predict an object 215 to be stowed in the vehicle 101 at a specific location, e.g., the current and/or destination location. The computer 105 can predict the stowage parameter when a probability output by the machine learning program is above a threshold, e.g., the object is likely to be stowed in the vehicle 101 at the current and/or destination location. If the computer 105 determines the location data 115 is associated with stowage parameters, the computer 105 can select the stowage parameters, and the process 300 continues to a block 340. Otherwise, the process 300 continues to a block 325.

In the block 325, the computer 105 predicts whether an object 215 will be stowed in the vehicle 101 at one of the current location and the destination location. As described above, the computer 105 can receive object data 115 associated with the object 215 to be stowed in the vehicle 101. For example, the computer 105 can query its memory, data store, etc. to determine whether object data 115 is associated with the location data 115 for a user. As another example, the computer 105 can receive reference data 115, e.g., object data 115 associated with the location data 115 for other users, via the network 125 to determine the stowage parameters when object data 115 is not associated with location data 115 for the user. In other words, the reference data 115 can identify objects 215 usually stowed in a vehicle 101 at the location. In this situation, the computer 105 can predict the stowage parameters based on the reference data 115. The computer 105 can analyze the object data 115, e.g., the characteristics of the object 215 to determine whether the object 215 can be stowed, i.e., whether it will fit, in a stowage position the vehicle 101. For example, the computer 105 can determine whether the size, e.g., dimensions, and/or weight of the object 215 is above a threshold for the vehicle 101. If the computer 105 determines the object can be stowed in the vehicle 101, the process 300 continues to a block 335. Otherwise, the process 300 continues to a block 330.

In the block 330, the computer 105 can send a message to the server 130 via the network 125 requesting a second vehicle. The message can include the location data 115, e.g., the current location and the destination location of the user, and the object data 115. The second vehicle can be selected based the object data 115, e.g., the object 215 can fit in the second vehicle, and the location data 115, e.g., the location of the second vehicle is within a threshold distance, e.g., a radius, from the current location. After the second vehicle is requested, the process 300 ends.

In the block 335, the computer 105 predicts the stowage parameters based on the object data 115. As described above, the computer 105 can determine a stowage parameter based on the characteristics of the object 215 and can assign the object to a stowage element 122 corresponding to the stowage parameter, e.g., hangable, fragile, heavy, etc.

Next, in a block 340, the computer 105 actuates a vehicle component 120 based on the stowage parameters. For example, the computer 105 can actuate the suspension component from the driving position to the stowage position to assist the user in stowing the object 215 in the vehicle 101. As another example, the computer 105 can actuate the stowage elements 122 from the first position to the second position. As described above, the computer 105 can actuate one or more stowage elements 122 to support one or more objects 215 in the vehicle 101. After the object 215 is stowed in the vehicle 101, the computer 105 can actuate the suspension component from the stowage position to the driving position, and the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method, comprising:
   identifying a current location and a destination location of a vehicle;
   predicting a stowage parameter based on inputting the current and destination locations and a vehicle activity log, to a machine learning program, wherein the vehicle activity log stores historical data about vehicle locations at respective times and objects stored in the vehicle at the respective times; and
   actuating a vehicle component based on the stowage parameter.

2. The method of claim 1, wherein the vehicle component is one of a suspension, a seat, and a stowage element.

3. The method of claim 1, further comprising predicting the stowage parameter based on a characteristic of an object as well as one or both of the current and destination locations in the vehicle.

4. The method of claim 3, further comprising predicting one stowage parameter for each object of a plurality of objects.

5. The method of claim 1, further comprising receiving a message from a user device, and predicting the stowage parameter based on the message from the user device.

6. The method of claim 1, further comprising predicting the stowage parameter based on user input.

7. The method of claim 1, further comprising predicting the stowage parameter based on a message from each sensor in a set of a seat sensors.

8. The method of claim 1, wherein the stowage parameter specifies a manner in which objects stowed for transport from the current location to the destination location.

9. A system, comprising a computer programmed to:
   identify a current location and a destination location of a vehicle;
   predict a stowage parameter based on inputting the current and destination locations, and a vehicle activity log, to a machine learning program, wherein the vehicle activity log stores historical data about vehicle locations at respective times and objects stored in the vehicle at the respective times; and
   actuate a vehicle component based on the stowage parameter.

10. The system of claim 9, wherein the vehicle component is one of a suspension, a shelf, a hook, a storage bin, and a seat.

11. The system of claim 9, wherein the computer is further programmed to predict the stowage parameter based on a characteristic of an object as well as one or both of the current and destination locations in the vehicle.

12. The system of claim 11, wherein the computer is further programmed to predict one stowage parameter for each object of a plurality of objects.

13. The system of claim 9, wherein computer is further programmed to receive a message from a user device and predict the stowage parameter based on the message from the user device.

14. The system of claim 9, wherein the computer is further programmed to predict the stowage parameter on based user input.

15. The system of claim 9, wherein the computer is further programmed to predict the stowage parameter based on a message from each sensor in a set of a seat sensors.

16. The system of claim 9, wherein the stowage parameter specifies a manner in which objects stowed for transport from the current location to the destination location.

17. A system, comprising:
   a stowage element that includes an actuator arranged to move at least part of the stowage element; and
   a computer programmed to:
      identify a current location and a destination location of a vehicle;
      predict a stowage parameter based on inputting the current and destination locations, and a vehicle activity log, to a machine learning program, wherein the vehicle activity log stores historical data about vehicle locations at respective times and objects stored in the vehicle at the respective times; and actuate a vehicle component based on the stowage parameter.

18. The system of claim 17, wherein the computer is further programmed to predict the stowage parameter based on a characteristic of an object as well as one or both of the current and destination locations in the vehicle.

19. The system of claim 17, wherein the stowage parameter specifies a manner in which objects stowed for transport from the current location to the destination location.

* * * * *